United States Patent Office 3,029,276
Patented Apr. 10, 1962

3,029,276
PROCESS FOR THE PRODUCTION OF 3,5-DISUB-
STITUTED-4-HYDROXY BENZOIC ACIDS AND
THEIR ESTERS
Arnold Hausweiler, Leverkusen, Robert Seydel, Koln-
Delibruck, and Rudolf Stroh, Leverkusen, Germany,
assignors to Farbenfabriken Bayer Aktiengesellschaft,
Leverkusen, Germany, a corporation of Germany
No Drawing. Filed June 5, 1959, Ser. No. 818,266
Claims priority, application Germany June 25, 1958
6 Claims. (Cl. 260—473)

The present invention relates to a process for the production of 3,5-disubstituted-4-hydroxy benzoic acids and their esters and is more particularly concerned with the preparation of those compounds by reacting 2,6-disubstituted phenols with carbon tetrachloride.

It is known that a carboxyl group can be introduced into phenols, monoalkyl phenols and monoalkyl phenol carboxylic acids by heating them for several hours with carbon tetrachloride and aqueous alkali solutions in the presence of copper (see German patent specification 258,887).

If 2,6-disubstituted phenols are used in the aforementioned process, no clear reaction products are obtained but strongly coloured compounds which are quinoidal condensation products of the phenols with the carbon tetrachloride.

It is an object of this invention to provide a process for the production of 3,5-disubstituted-4-hydroxy benzoic acids and their esters. Another object of the present invention is to prepare 3,5-disubstituted-4-hydroxy benzoic acids and their esters by using 2,6-disubstituted phenols as starting materials in the process. A still further object is to prepare 3,5-disubstituted-4-hydroxy benzoic acids and their esters by reacting 2,6-disubstituted phenols with carbon tetrachloride to form the desired benzoic acids. Still further objects will become apparent hereinafter.

It has now been found that esterified 3,5-disubstituted-4-hydroxy benzoic acids are obtained if 2,6-disubstituted phenols are reacted with carbon tetrachloride in the presence of copper or copper compounds and a solution of an alkali metal hydroxide in a mixture of an alcohol and water. The esters thus obtained may be saponified if desired.

The 2,6-disubstituted phenols employed in the process of the present invention may contain saturated and unsaturated aliphatic, cycloaliphatic and aryl radicals in the 2 and 6 positions. Examples of such phenols are 2,6-diethyl-phenol, 2,6-diisopropyl-phenol, 2,6-di-tert.-butyl-phenol, 2,6-di-sec.-butyl-phenol, 2-tert.-butyl-6-allyl-phenol, 2-tert.-butyl-6-cyclohexyl-phenol, 2-tert.-butyl-6-cyclopentenyl-phenol and 2-phenyl-6-tert.-butyl-phenol.

The process of the present invention is preferably carried out in an alcohol-water solution of an alkali metal hydroxide having an alcohol content of from 50 to 90%. The concentration of the alkali metal hydroxides may be varied within wide limits. Thus, the reaction can be carried out with very dilute solutions and also with saturated solutions. The quantity of alkali metal hydroxide should preferably be from 1 to 1.5 equivalents, based on the carbon tetrachloride. This corresponds to a molar ratio of from 4 to 6 mols of alkali metal hydroxide per mol of carbon tetrachloride.

The carbon tetrachloride itself is used in equimolecular quantity or in a slight excess, based on the phenol.

Copper, preferably powdered copper or copper salts such as copper sulphate, copper acetate and/or copper nitrate, are added as catalyst to the reaction mixture. Generally speaking, catalytic quantities are sufficient, but larger quantities can be added if desired.

The initial products resulting from the process according to the present invention are esters which, after isolation may, if desired, be converted into the corresponding free acids by reacting them with alkali metal hydroxides.

In one preferred embodiment of the invention, the reaction is carried out in such a way that the carbon tetrachloride is gradually added to a mixture of the alcohol-water solution of the alkali metal hydroxide and the phenol at an elevated temperature, for example at a temperature of up to 80° C. and in the presence of powdered copper or copper compounds. The esters can then be recovered from the reaction mixture after the reaction is complete, for example by pouring into water. Instead of isolating the esters they may be converted into the corresponding free acids by heating them with aqueous or alcoholic alkali metal hydroxide solutions.

The products obtained according to the present invention are valuable intermediates for the synthesis of insecticides. Thus for example some of their esters and amides can directly be used as insecticides (compare Example 3).

EXAMPLE 1

*3,5-Di-Tert.-Butyl-4-Hydroxy-Benzoic Acid Methyl Ester*

40 g. of 2,6-di-tert.-butyl-phenol are dissolved in 150 cc. of methanol. 60 g. of sodium hydroxide in the form of a 40% aqueous solution and 1 g. of copper sulphate are added to the 2,6-di-tert.-butyl-phenol solution followed by the addition of 40 g. of carbon tetrachloride dropwise over a period of 15 minutes while stirring. The temperature in the reaction vessel rises to 75° C. Stirring is continued for 10 minutes and then the reaction mixture is poured into 700 cc. of water. A yellowish-red product separates out which is filtered with suction, dissolved in glacial acetic acid, brightened by adding from 10 to 20 cc. of sulphite solution at 50° C. and then separated from impurities which are initially deposited in an oily form by carefully adding water. The ester thus obtained is precipitated as a yellow powder by adding a large quantity of water. The yield of crude product is from 75% to 86% of the theoretical.

From the aqueous mother liquor, a mixture of ester and carboxylic acid is precipitated by adding hydrochloric acid, and this mixture can be separated by treatment with caustic soda solution.

The methyl ester is obtained in pure form and with a M.P. of 159° C. by recrystallization from methanol, water or ligroin.

EXAMPLE 2

*3,5-Diisopropyl-4-Hydroxy-Benzoic Acid Methyl Ester*

36 g. of 2,6-diisopropyl-phenol are dissolved in 150 cc. of methanol. 65 g. of sodium hydroxide in the form of a 40% aqueous solution and 2 g. of copper powder are added thereto. 40 g. of carbon tetrachloride are slowly added dropwise at a temperature of from 45° C. to 50° C. while stirring. The temperature in the reaction vessel is thereafter allowed to rise to 80° C. without cooling. When the exothermic reaction has ceased, the product is poured into water and the solution is extracted by shaking with benzene. The benzene is removed by washing with dilute caustic soda solution and the methyl ester distilled at a pressure of 3 mm. B.P. 160° C.; yield 85–92% of the theoretical.

The distillation product solidifies in the receiver and has a melting point of 92–93° C. after it has been recrystallized from acetic acid.

EXAMPLE 3

*3,5-Di-Tert.-Butyl-4-Hydroxy Benzoic Acid*

40 g. of 2,6-di-tert.-butyl-phenol are dissolved in 150 cc.

of methanol. After adding 65 g. of sodium hydroxide in the form of a 50% aqueous solution and 2 g. of copper sulphate, the mixture is heated to 60° C. and 45 g. of carbon tetrachloride are added dropwise while stirring and at such a rate that the temperature is kept at 70° C. without external heating. When all the carbon tetrachloride has been added, the temperature is maintained at 70° C. for a further hour, whereupon a solution of 50 g. of sodium hydroxide dissolved in 70 cc. of methanol and 40 cc. of water is added, and the mixture is boiled for 6 hours under reflux while constantly stirring. The reaction mixture is poured into water to separate out secondary products which are filtered off. The carboxylic acid is then precipitated by adding hydrochloric acid to the reaction mixture. In order to effect purification of the carboxylic acid it is dissolved in hot caustic soda solution, treated with animal charcoal, filtered and precipitated with hydrochloric acid. Yield: 85–94% of the theoretical.

It is possible in the process described in this example, to use 2,6-dialkyl phenols other than 2,6-di-tert.-butyl-phenol; when using cyclohexyl phenols, however, it is advisable to boil for a relatively long time to effect saponification. By employing this process the following compounds were obtained in the yields specified:

|  | Yield, percent | M. P., degrees |
|---|---|---|
| 3,5-diethyl-4-hydroxy benzoic acid | 78–86 | 152 |
| 3,5-di-sec.-butyl-4-hydroxybenzoic acid | 85–92 | 107 |
| 3,5-diisopropyl-4-hydroxy benzoic acid | 85–92 | 147 |
| 3-methyl-5-tert.-butyl-4-hydroxy benzoic acid | 82–90 | 172 |
| 3-tert.-butyl-5-cyclohexyl-4-hydroxy benzoic acid | 70–78 | 179.5 |

3,5-di-tert.-butyl-4-hydroxy benzoic acid propen-(2)-yl-(1) ester and 3,5-di-tert.-butyl-4-hydroxy benzoic acid 2-diethyl-aminoethyl ester are prepared by esterifying 3,5-di-tert.-butyl-4-hydroxy benzoic acid with propen-(2)-ol-(1) or 2-diethylaminoethylalcohol respectively in known manner.

The esters thus obtained are mixed with the same amount of dimethylformamide and 50% by weight, referred to active ingredient, of benzyl-oxydiphenyl-polyglycol-ether as emulsifier, the solutions being subsequently diluted with water to the concentration shown below. These emulsions were sprayed drip wet on leaves of white cabbage, heavily infested with caterpillars, species plutella maculipennis. The activity of the compounds against these caterpillars is shown in the table below.

| Compound | Percent concentration of active ingredient in water | Killing rate of caterpillars in percent after 4 days |
|---|---|---|
| $(CH_3)_3C$—⌬—$C(CH_3)_3$ (OH, COO—$CH_2$—CH=$CH_2$) | 0.2 | 100 |
| $(CH_3)_3C$—⌬—$C(CH_3)_3$ (OH, COO—$CH_2$—$CH_2$—N($C_2H_5$)($C_2H_5$)) | 0.2 / 0.2 | 100 / 90 |

EXAMPLE 4

3-Tert.-Butyl-5-Cyclopentenyl-4-Hydroxy Benzoic Acid 21 g. of 2-tert.-butyl-6-cyclopentenyl-phenol and 25 g. of caustic soda are dissolved in a mixture of 100 cc. of methanol and 60 cc. of water. 1 g. of copper sulphate is added to the solution and 17 g. of carbon tetrachloride are added dropwise at a temperature of from 68° C. to 72° C., while stirring thoroughly. When the exothermic reaction has ceased, a solution of 25 g. of caustic soda in 30 cc. of water is added and the mixture heated for 10 hours at 70° C. The solution is then diluted with water and acidified. The carboxylic acid is dissolved out from the solid precipitate thus obtained with dilute aqueous ammonia solution and it is precipitated with dilute hydrochloric acid. Melting point: 139–142° C. (recrystallized from methanol-water). Yield: 38% of the theoretical.

What we claim is:

1. A process comprising reacting at a temperature between about room temperature and 100° C. substantially equi-molecular amounts of carbon tetrachloride and a phenol substituted in each ortho-position with a member selected from the group consisting of methyl, ethyl, isopropyl, tertiary butyl, sec. butyl, allyl, cyclohexyl, cyclopentenyl and phenyl radicals in an alcohol water solution of about 50–90% concentration containing about 4–6 mols of an alkali metal hydroxide per mol of carbon tetrachloride and a catalytic amount of a catalyst selected from the group consisting of copper, copper sulphate, copper acetate, copper nitrate and mixtures thereof to thereby form a 4-hydroxy benzoic acid ester substituted in the 3,5 positions with members of said first mentioned group.

2. Process according to claim 1, which includes saponifying the 3,5 disubstituted 4-hydroxy benzoic acid ester and recovering the free 3,5-disubstituted benzoic acid from the reaction mixture.

3. Process according to claim 1 in which said alkali metal hydroxide is selected from the group consisting of sodium hydroxide and potassium hydroxide.

4. Process according to claim 1, in which said phenol is 2,6-di-tert.-butyl-phenol, said alkali metal hydroxide is sodium hydroxide, said catalyst is copper sulphate, and in which the 3,5-di-tert.-butyl-4-hydroxy-benzoic methyl ester is isolated by pouring the reaction mixture into a larger amount of water.

5. Process according to claim 1 in which said phenol is 2,6-diisopropyl-phenol in which said catalyst is copper powder, said alcohol water solution is a methyl alcohol water solution, said alkali metal hydroxide is sodium hydroxide and in which the 3,5-diiso-propyl-4-hydroxy-benzoic methyl ester is isolated by pouring the reaction mixture into water and extracting the aqueous solution with benzene and subjecting the organic phase to fractional distillation.

6. Process according to claim 1 in which said phenol is 2,6-di-tert.-butyl-phenol, said alcohol water solution a methanol water solution, said alkali metal hydroxide sodium hydroxide, said catalyst copper sulphate, and which includes adding after completion of the reaction an excess of sodium hydroxide solution, refluxing the reaction mixture to effect saponification and recovering the benzoic acid formed.

References Cited in the file of this patent

UNITED STATES PATENTS 2,871,256    Ivins et al.    Jan. 27, 1959

FOREIGN PATENTS 258,887    Germany    Apr. 17, 1913